(12) United States Patent
Rancourt

(10) Patent No.: US 6,397,982 B2
(45) Date of Patent: Jun. 4, 2002

(54) DISC BRAKE HOUSING

(76) Inventor: Yvon Rancourt, 779 Boulevard Industriel, Blainville, Quebec (CA), J7C 3V3

( * ) Notice: Subject to any disclaimer, the term of this patent is extended or adjusted under 35 U.S.C. 154(b) by 0 days.

(21) Appl. No.: 09/799,498

(22) Filed: Mar. 7, 2001

(30) Foreign Application Priority Data

Jul. 25, 2000 (CA) .............................................. 2314547

(51) Int. Cl.$^7$ .............................................. F16D 55/12
(52) U.S. Cl. ................ 188/73.31; 188/72.4; 188/73.35; 188/73.36; 188/205 A; 188/366; 188/367
(58) Field of Search .............................. 188/73.31, 71.1, 188/18 A, 366, 367, 72.3, 72.4, 264 A, 264 AA, 205 R, 206 R, 71.5, 73.35, 73.36, 259, 249, 205 A, 73.43, 73.32, 73.39

(56) References Cited

U.S. PATENT DOCUMENTS 6,328,137 B1 * 12/2001 Rancourt ................. 188/73.31
6,336,534 B1 * 1/2002 Rancourt

FOREIGN PATENT DOCUMENTS

WO          WO 9829671          7/1998

* cited by examiner

*Primary Examiner*—Douglas C. Butler
(74) *Attorney, Agent, or Firm*—Birch, Stewart, Kolasch & Birch, LLP

(57) ABSTRACT

An annular disc brake assembly has a housing mounted to a vehicle and a rotor disk mounted to a wheel of the vehicle. A pair of annular brake shoes are in frictional engagement with the rotor disk during a brake action, and resiliently supported by the housing and a supportive structure of the vehicle, respectively. The housing includes an annular radial wall having an annular ridge on the inner surface to abut the brake shoe which is supported by the housing so that during the brake action uneven and various forces applied to the brake shoe will cause local portions of the brake shoe oscillating about the contact point. The oscillation will be damped by damping pads placed between the housing and the brake shoe. The housing has a plurality of axial link members extending from the annular radial wall. The axial link members include clip structure at each distal end for clipping onto the supportive structure of the vehicle. The housing used in the brake assembly improves the brake assembly regarding the reduction of vibration and brake squeal, and simplifies the assembling procedure.

27 Claims, 6 Drawing Sheets

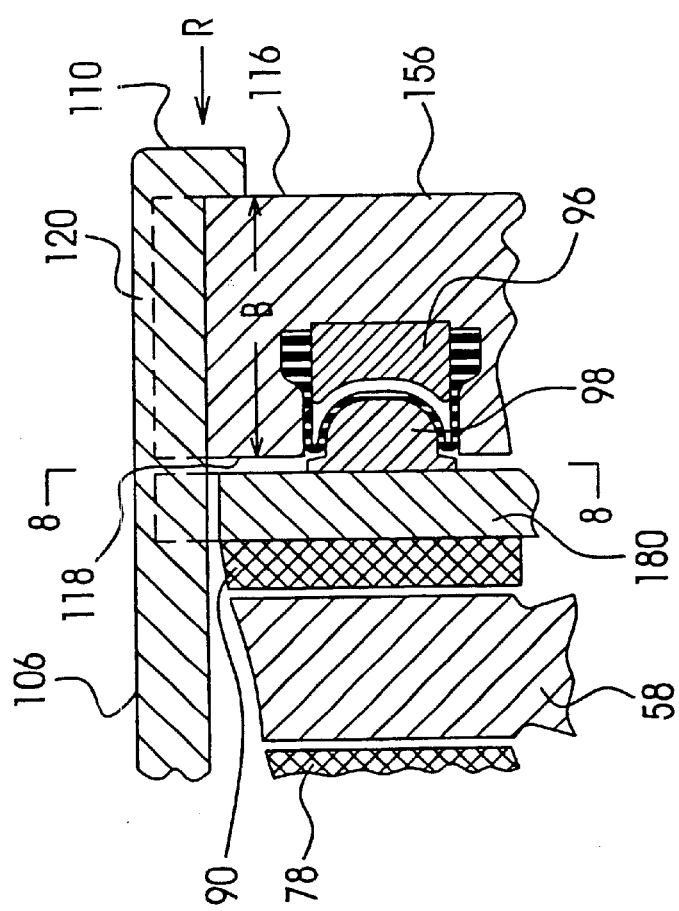
FIG. 6
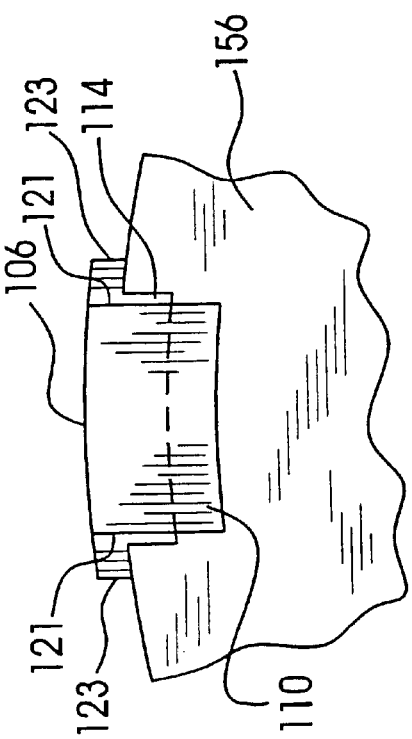
FIG. 4
FIG. 7

DISC BRAKE HOUSING

TECHNICAL FIELD

The present invention relates to disc brakes and more particularly to improvements in a disc brake housing used in large area contact disc brake for vehicles.

BACKGROUND ART

The disc brake housing of the present invention is used in disc brake assemblies of the type described in the applicant's PCT application of PCT/CA97/01014, entitled IMPROVED DISC BRAKE ASSEMBLY and published as WO98/29671 on Jul. 9, 1998. The disc brake assembly refers to full annular disc brakes proposed for automobiles and light trucks.

The full annular disc brake assembly described in this PCT application generally includes a housing mounted to a vehicle and a rotor disc mounted to a wheel of the vehicle. First and second annular brake pads extend parallel to the rotor disc within the housing and are mounted thereto. The second brake pad is movable axially by means of a fluid bladder mounted to the housing. The fluid bladder moves the second brake pad axially against the rotor disc. When pressure is applied to the rotor disc by the second brake pad and the bladder, the rotor disc is adapted to slide axially towards the first brake pad so that the rotor disc frictionally engages the first and second brake pads.

It has been found that vibrations between the first and second brake pads and the rotor disc are the major causes for break squeal.

The analysis of a vibration response is of considerable importance in the design of brakes that may be subjected to dynamic disturbances. Under certain situations, vibrations may cause larger displacements and severe stresses in the brake. The velocity of a braking system is, in general, proportional to its frequency and hence the viscous damping force increases with the frequency of the vibration. Forces resisting a motion also arise from dry friction along a non-lubricated surface. It is usually assumed to be a force of constant magnitude but opposed to the direction of a motion. In addition to the forces of air resistance and external friction, damping forces also arise because of imperfect elasticity or internal friction, called hysteric damping, within the body. The magnitude of such force is independent of the frequency but is proportional to the amplitude of vibration or to the displacement.

In the disc brake assembly elastic rolling seals are provided between the axially slidable rotor disc and the hub adapter, and between the second slidable brake pad and its support structure. The elastic rolling seal members are deformed and store energy therein when the rotor disc and the second brake pad are moved towards the first brake pad by the fluid bladder. When the brakes are released, the elastic rolling seals will be restored because of the energy stored therein and will return to the original shape, thereby moving the rotor disc and the second brake pad away from the first brake pad to release the frictional engagement therebetween. The elastic rolling seals also serve to suspend the rotor disc and the second brake pad to absorb the vibration energy and damp the vibration of the rotor disc and the second brake pad. In order to avoid self-induced evaporation phenomenon, the opposed annular friction surfaces on the rotor disc have different radii and the first and second annular brake pads are radially staggered accordingly so that these vibrations induced therefrom are at different frequencies and thus reduce the chances of harmonics, which helps to reduce the brake squeal and stresses which might occur in the disc brake.

The disc brakes described in the applicant's patent application PCT/CA97/01014 work well and are welcomed by customers. However, there are still needs for additional improvements to further reduce the vibrations and the brake squeal caused therefrom to a lower level.

SUMMARY OF THE INVENTION

It is an object of the present invention to provide a disc brake housing, especially for a full annular disc brake for automobiles, that has an improved configuration to aid in better reduction of vibrations and brake squeals caused from the vibrations.

It is another object of the present invention to provide a disc brake housing which is easy for assembly.

It is yet another object of the present invention to provide a disc brake shoe that has an improved configuration for attachment to a disc brake housing to aid in better reduction of vibrations.

It is a further object of the present invention to provide a disc brake assembly that is provided with improved damping means to reduce the vibrations induced from the annular brake shoes.

Generally a disc brake assembly for a vehicle wheel includes a housing, first and second annular brake shoes and a rotor disc having first and second annular radial planar surfaces substantially parallel to each other. The rotor disc is coaxially mounted to the wheel and axially movable with respect to the wheel.

The disc brake housing of the assembly comprises an annular radial wall operatively supporting the first annular brake shoe adjacent to the first friction surface of the rotor disc. The annular radial wall is axially spaced apart from and connected to an annular support radial wall, which is adapted to be mounted to a frame of the vehicle and operatively supports the second annular brake shoe adjacent to the second friction surface of the rotor disc. Means are provided for restricting the respective first and second brake shoes from rotating with the disc.

An annular fluid expandable bladder extends between the second radial wall and the second brake shoe, whereby upon expansion of the bladder the second brake shoe moves axially towards the rotor disc and further presses the rotor disc against the first brake shoe, resulting in respective frictional engagement between the first friction surface of the rotor disc and the first brake shoe, and between the second friction surface of the rotor disc and the second brake shoe.

The disc brake assembly, in accordance with one aspect of the present invention, further includes damping means between the first radial wall and the first brake shoe for damping vibration produced from the first brake shoe when the first brake shoe is frictionally engaged with the first friction surface of the rotor disc.

The damping means preferably comprises a plurality of damping pads which are preferably made of a resilient and deformable material. The damping pads are circumferentially spaced apart from one another and attached to an exterior periphery of an axial portion of the first brake shoe. The damping pads are positioned to contact the inner edge of the annular radial wall so that the first brake shoe is radially and resiliently supported by the first annular radial wall. The annular radial wall preferably includes an annular ridge raised from an inner surface of the wall to abut a radial portion of the first brake shoe when the first brake shoe is pressed by the rotor disc during the frictional engagement.

Thus, the first brake shoe is axially supported by the annular radial wall through the annular ridge. However uneven or various axial forces applied to the first annular brake shoe from the rotor disc, which might result from uneven wearing, imperfect machining or other defects of the parts and generally cause the vibration of the first annular brake shoe, will cause local portions of the first annular brake shoe to oscillate about the contact point on the annular ridge of the annular radial wall. The local oscillation of the first annular brake shoe about the contact point on the annular ridge of the annular radial wall causes a radial vibration of the local axial portion of the first annular brake shoe. The radial vibration will be damped by the damping pads and will not be further transferred to the annular radial wall and other structure of the disc brake assembly.

In accordance with another aspect of the present invention, a disc brake housing for the brake assembly comprises an annular radial wall operatively supporting a first annular brake shoe adjacent to the first friction surface of the rotor disc. The annular radial wall is axially spaced apart from and connected to a radial support wall. The annular radial wall includes a plurality of axial link members circumferentially spaced apart from one another and integrally extended from the first radial wall. The annular support second radial wall is adapted to be mounted to a frame of the vehicle and operatively supporting a second annular brake shoe adjacent to the second friction surface of the rotor disc. Clip means is provided at the distal end of each of the link members to enable the link members to clip onto the external periphery of the annular support second radial wall.

The clip means preferably include a distal end edge bent at a substantially right angle with respect to the link member. The clip means further include a pair of shoulders flanking the link member and spaced apart from the bent end edge. When the clip means of each member clips on the external periphery of the annular support second radial wall, a resilient force produced by the formation of the link member enables the bent end edge and the shoulders to abut a pair of opposed radial surfaces of the annular support second radial wall to secure the radial wall therebetween.

The disc brake housing according to the present invention, further improves the disc brake assembly described in the prior art, using the damping means to resiliently support the first brake shoe on the radial wall. Now the rotor disc and the first and second brake shoes are all resiliently supported. Therefore, the vibrations from these parts will be damped and not further transferred to the housing structure, and the brake squeal is reduced to a further lower level. The disc brake housing uses a link member to connect the two opposed radial walls of the housing instead of a complete cylindrical wall used in the prior art. With such configuration, the weight of the brake assembly is reduced and therefore the cost of manufacturing the disc brake assembly is also reduced. In addition, the spaced link member structure is better than the cylindrical wall to reduce the possible vibration of the brake housing.

Other features and advantages of the disc brake housing according to the present invention will be understood with reference to the preferred embodiments described below.

BRIEF DESCRIPTION OF THE DRAWINGS

Having thus generally described the nature of the invention, the invention will now be described in detail having reference to the accompanying drawings in which:

FIG. 4 is a partial cross-sectional view taken along line 4—4 in FIG. 1, showing means for restraining the second brake shoe from rotating with the rotor disc;

FIG. 6 is a partial, longitudinally cross-sectional view of a disc brake assembly including the disc brake housing shown in FIG. 5;

FIG. 7 is a partial rear view of FIG. 6, indicated by arrow R for illustrating the connection of the link member to the annular radial support wall;

DETAILED DESCRIPTION OF THE PREFERRED EMBODIMENTS

Figure 1:
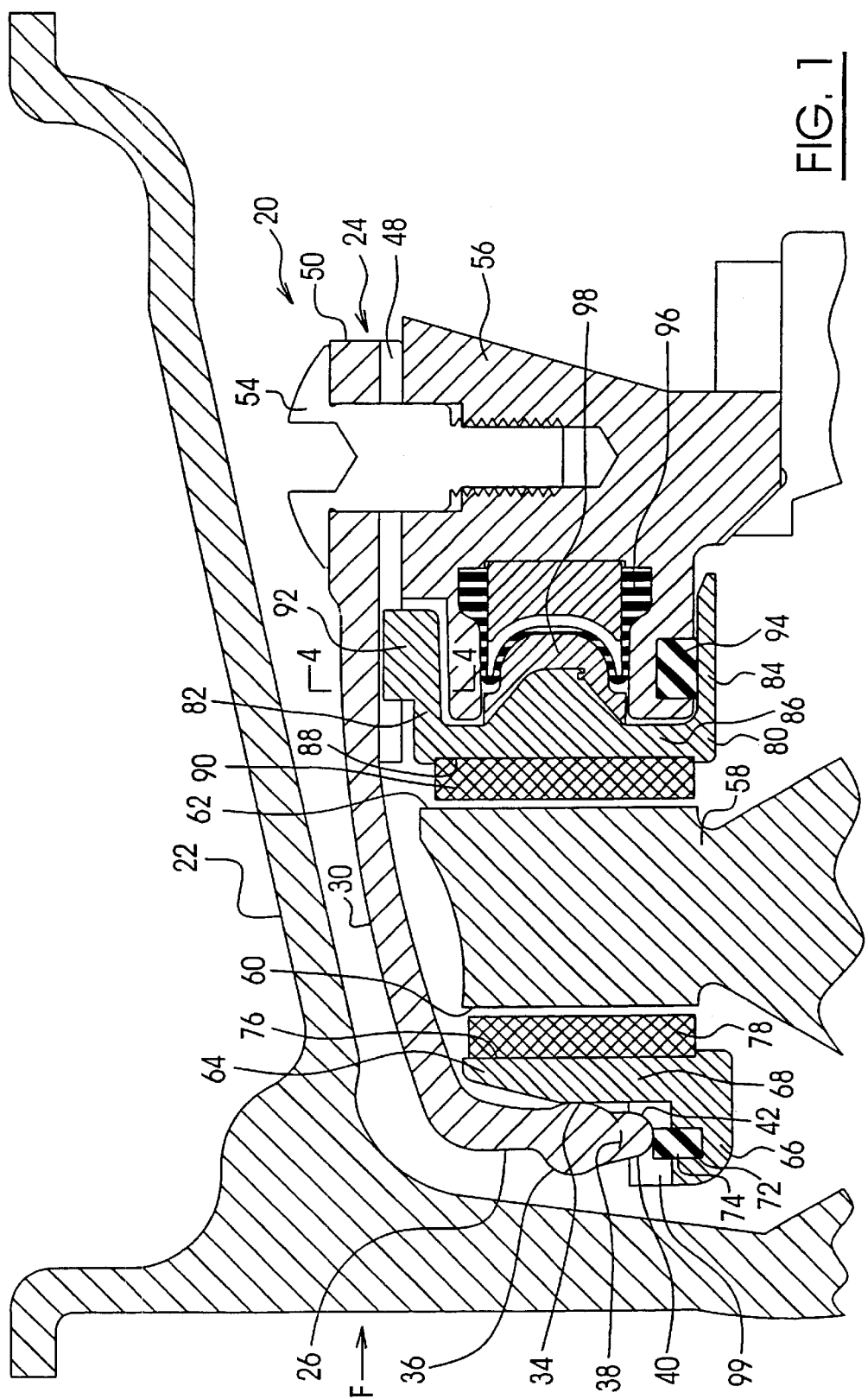
FIG. 1 is a partial, longitudinally cross-sectional view of a disc brake assembly incorporating one of the preferable embodiments of the invention.
Figure 2:
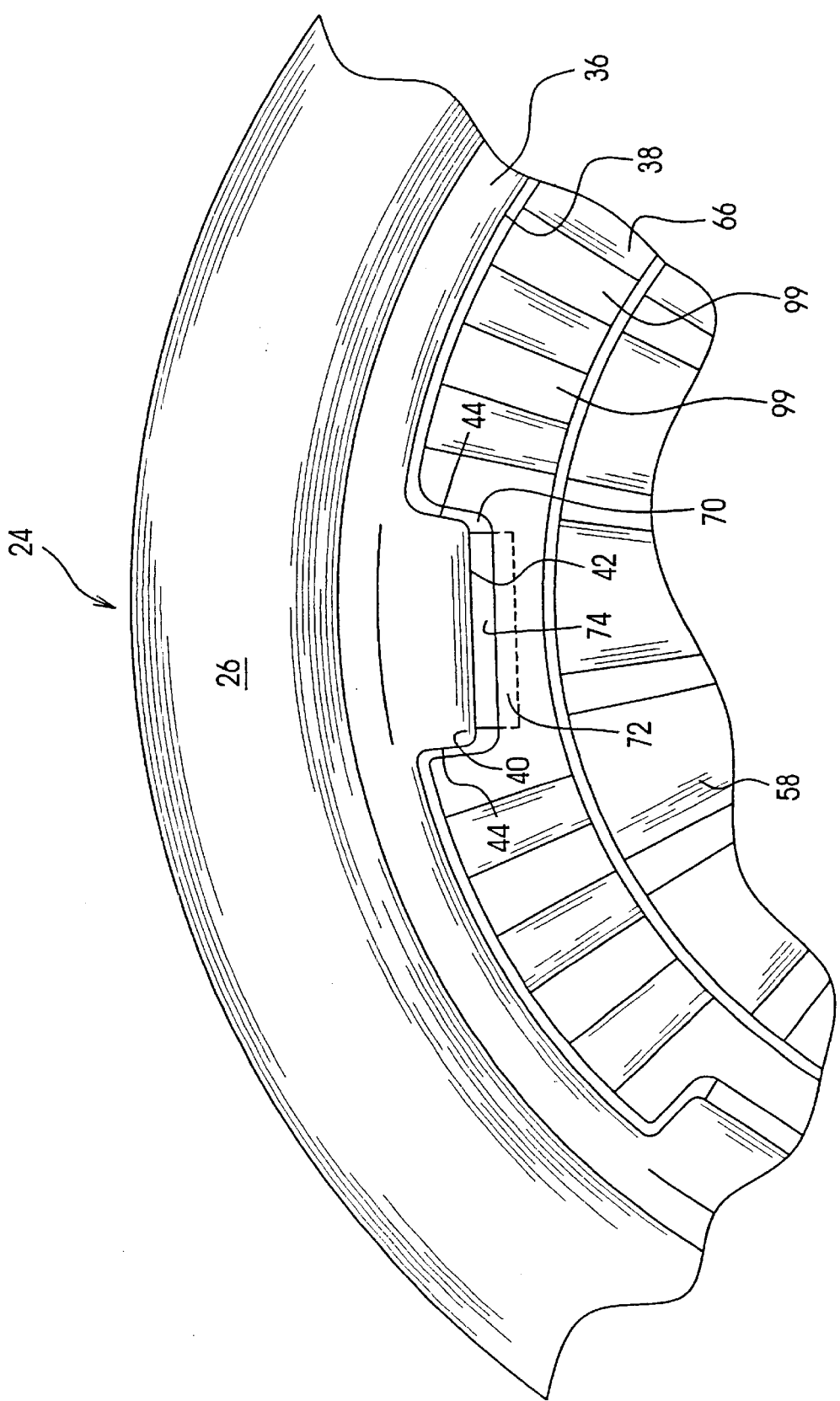
FIG. 2 is a partial front view of FIG. 1, indicated by arrow F and the wheel of the vehicle being removed.
Figure 3:
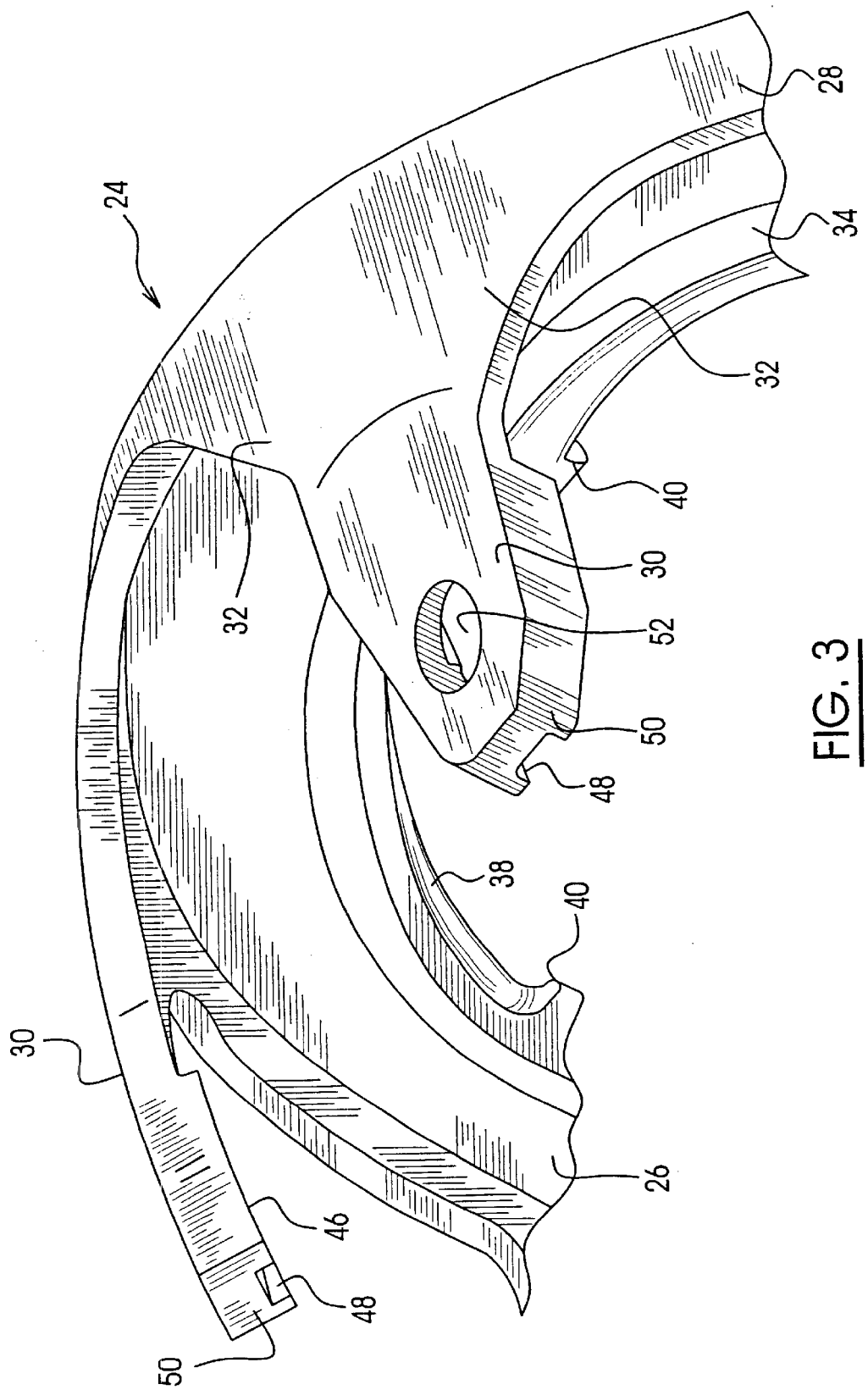
FIG. 3 is a partial perspective view of a disc brake housing shown in FIG. 1.

Referring now to drawings and more particularly FIGS. 1 through 3, the disc brake assembly 20 for an automobile wheel 22 is illustrated having a housing 24. The housing 24 has an annular radial wall 26. including an axially flanged edge 28 at its external periphery. A plurality of link members 30 extend axially from the flanged edge 28 (FIG. 3). The link members are circumferentially spaced apart from one another and each link member 30 is flanked by two triangular portions 32 to increase the strength and solidity of the connection between the link member 30 and the annular radial wall 26.

The annular ridge 34 is raised from the inner surface of the annular radial wall 26 with a smoothly curved surface for abutting the annular brake shoe 64, which will be described in detail below. An annular portion 36 of the external surface of the annular radial wall 26, at the inner edge 38, is raised outwards with smoothly curved surface for strengthening the housing structure. A plurality of radial protruding members 40 are provided at the inner edge 38 of the annular radial wall 26, circumferentially spaced apart from one another. Each of the radially protruding members 40 has a smoothly curved end surface 42 and opposed flat side surfaces 44 (FIG. 2).

Each of the link members 30 includes an inner surface 46 (FIG. 3) having a groove 48 extending axially and inwardly from the distal end 50 and terminates at the middle of the link member. A mounting opening 52 is defined in each link member 30 adjacent to the distal end 50 to receive a bolt 54 therethrough to detachably connect a radial support wall 56. The radial support wall 56 is secured to the frame of the vehicle for supporting the brake assembly 20.

An annular rotor disc 58 is co-axially mounted to the wheel 22 and axially moveable with respect to the wheel 22, which is well known and described with details in the applicant's PCT application PCT/CA97/01014, and will not be further described in this specification. The rotor disc 58 has the first radial planar annular friction surface 60 and a second radial planar annular friction surface 62 at the opposed sides respectively, and perpendicular to the wheel axis.

A first annular brake shoe 64 includes an annular axial section 66 and a annular radial section 68 extending outwardly from the axial section 66. The axial section 66 includes a plurality of notches 70, (FIG. 2), on the external periphery, spaced apart from one another. Each notch 70 has a recess 72 to receive a damping pad 74 being attached on the bottom of the notch. Therefore, the first annular brake shoe 64 is radially supported by the annular radial wall 26 when the axial section 66 is placed within the inner edge 38 of the annular radial wall 26 while the radially protruding members 40 of the annular radial wall 26 extend into the respective notches 70 to contact the damping pads 74. The damping pads 74 are made of a resilient and deformable material adequate for absorbing vibration energy. The first brake shoe 64 has an annular planar surface 76 adjacent to the first radial planar annular friction surface 60 of the rotor disc 58. The annular brake pad lining 78 is provided and attached to the annular planar surface 76, and slightly spaced apart from the first radial planar annular friction surface 60 of the rotor disc 58.

A second annular brake shoe 80 includes an external axial section 82, the internal axial section 84 and a radial section 86. The radial section 86 has a annular planar surface 88 adjacent and parallel to the second radial planar annular friction surface 62 of the rotor disc 58. A brake pad lining 90 is provided and attached to the radial planar surface 88, and slightly spaced apart from the second radial planar annular friction surface 62 of the rotor disc 58. A plurality of keys 92 are provided at the periphery of the external axial section 82 and circumferentially spaced apart from one another. The keys 92 are slidably received in the respective grooves 48, as shown in FIG. 4, to permit the second annular brake shoe 80 axially movable with respect to the brake housing 24 and restrain the second annular brake shoe 80 from rotation. The second annular brake shoe 80 is radially supported to the radial support wall 56 using a annular rolling seal 94 which is received in an annular recess of the radial support wall 56 and tightly surrounds the inner axial section 84 of the second annular brake shoe 80.

An annular bladder assembly 96 is attached to the radial support wall 56. When fluid such as oil is fed into the bladder assembly 96 it will expand, moving the second annular brake shoe 80 through an annular adapter 98, axially towards the friction surface 62 of the rotor disc 58. The rotor disc 58 will also slide axially, in response to the force exerted by the bladder assembly 96, and the radial friction surface 60 will come in frictional contact with the brake lining 76. Thus, when it is necessary to apply the brakes, the bladder assembly 96 is expanded. However, to release the brakes the oil is allowed to drain from the bladder assembly 96, thereby releasing the axial force on the second annular brake shoe 80, allowing the disc rotor 58 to rotate freely within the housing 24.

As described in the applicant's PCT application PCT/CA97/01014, the rolling seal 94 is made from resilient and deformable material and is pre-compressed when inserted between the annular recess of the radial support wall 56 and the inner axial section 84 of the second annular brake shoe. Thus, the annular rolling seal 94 serves not only as a vibration damping mechanism for the second brake shoe 80 but also produces an axial return force to move the second brake shoe 80 away from the rotor disc 58 when the axial force applied by the bladder assembly 96 is released. Because when the second annular brake shoe 80 axially moves towards the rotor disc 58, the rolling seal 94 will be deformed in the direction of the path of the brake shoe 80, the rolling seal 94 will be restored by the energy stored therein and will return to the shape before the brake shoe 80 axially moves towards the rotor disc 58, thereby moving the brake shoe 80 away from the rotor disc 58. Similar structures are used between the rotor disc 58 and its wheel support structure to move the rotor disc 58 away from the first annular brake shoe 64, which is not described here.

During the brake action, the respective frictional engagement between the rotor disc 58 and the first brake shoe 64, and between the rotor disc 58 and the second brake shoe 80 will have a tendency to rotate the first and second brake shoes together with the rotor disc. However, as described above, the keys 92 on the periphery of the external axial section 82 of the second brake shoe 80 will restrain the second brake shoe 80 from rotating together with the rotor disc 58. The first brake shoe 64 is restrained from rotating together with the rotor disc 58 by the radially protruding members 40 on the inner edge 38 of the annular radial wall 26. The radially protruding members 40 extend into the respective notches 70 in the axial section 66 of the first brake shoe 64 so that the opposed planar side surface 44 will abut either side wall of the notches 70 to restrain the rotation of the first brake shoe with respect to the housing 24.

The plurality of the radial fins 99 are provided on the axial section 66 of the first brake shoe 64, circumferentially spaced apart from one another to increase air contact surfaces of the first annular brake shoe 64 to better cool the first brake shoe and avoid over-heat damage which might be caused by the heat produced from the frictional engagement during a brake action.

During a brake action, the first brake shoe 64 is under an axial force applied by the bladder assembly 96 through the second brake shoe 80 and the rotor disc 58, and abuts the annular ridge 34 on the annular radial wall 26. In a cross-sectional view as shown in FIG. 1, the annular ridge 34 contacts a middle point of the radial section 68 of the first brake shoe 64, and the contacting surface of the annular ridge 34 is smoothly curved so that uneven and variable forces, which might result from uneven wearing, imperfect machining or other defects of the brake parts and are applied to the radial section 68 of the first brake shoe 64, will force the local portions of the first annular brake shoe 64 to oscillate about the ridge 34, resulting in corresponding local portions of the axial section 66 to vibrate radially. The radial vibration of the local portions of the axial section 66 of the first brake shoe 64 will have the resilient and deformable damping pads 74 periodically compressed between the end surface 42 of the radially protruding members 40 and the axial section 66 so that the vibration energy of the first brake shoe 64 is damped by the damping pads 64, and will not be transferred to the housing 24, or to other structures of the vehicle.

It is noted that the first and second annular planar radial friction surfaces 60,62 have different average radii and the first and second annular brake shoes 64,80 are radially staggered accordingly. Therefore, the vibrations induced from the frictional engagement during a brake action will be at different frequencies, and thus reduce the chances of harmonics, which helps to reduce the brake squeal and stresses that might occur in the disc brake.

Figure 5:
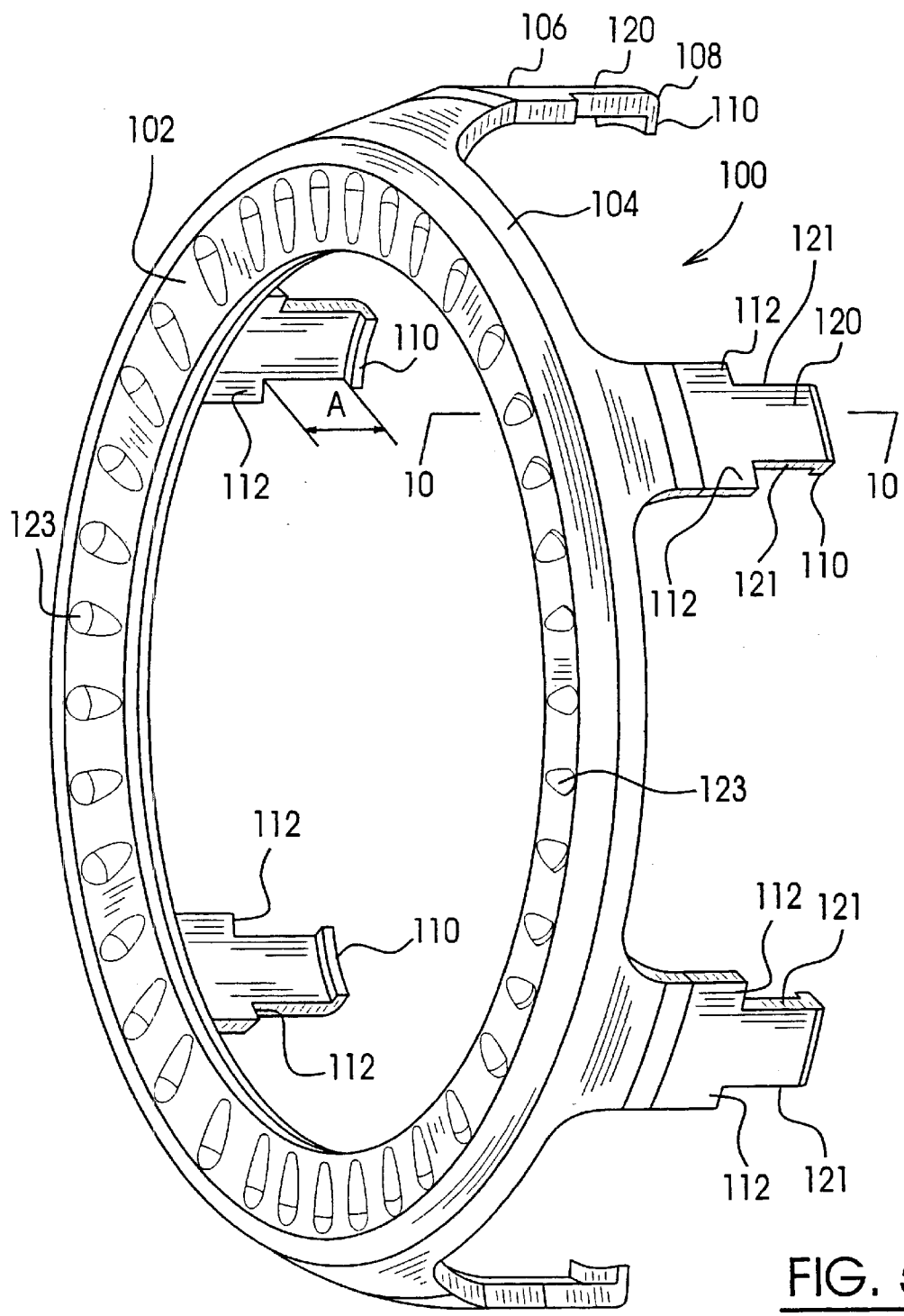
FIG. 5 is a perspective view of a disc brake housing in accordance with another preferred embodiment of the invention.

FIG. 5 illustrates a disc brake housing used in the disc brake assembly in accordance with a further embodiment of the present invention. The brake housing, generally indicated by numeral 100 includes an annular radial wall 102 for operatively supporting the first annular brake shoe, and a flanged edge 104 extending axially from the external periphery of the annular radial wall 102. A plurality of axial link members 106 are provided and extend integrally from the axial fringe 104, circumferentially spaced apart from one another.

Each of the axial link members 106 includes a distal end 108 with its edge 110 bent at a substantially right angle with respect to the link member 106. The link member 106 further includes a pair of shoulders 112, flanking the link member 106 and axially spaced apart from the bent end edge 110. The space between the shoulders 112 and the bent end edge 110 as indicated by the letter A, is accurately predetermined, which is to be described in details below.

The disc brake housing 100 clips onto the radial support wall according to this embodiment, rather than being connected to the radial support wall 56 using bolts 54 as shown in FIG. 1. Therefore, the external periphery of the radial support wall in this embodiment is different from the radial support wall 56, in order to provide an adequate structure for the clip engagement with the housing 100. As shown in FIGS. 6 and 7, a plurality of notches 114 are provided on the external periphery of the radial support wall 156 and circumferentially spaced apart from one another, only one notch being shown. The radial support wall 156 has, at least at the area adjacent to each notch 114, opposed side surfaces 116 and 118. The opposed side surfaces 116 and 118 are parallel to each other and the distance therebetween, as indicated by the letter B, is accurately determined. The distance B is slightly greater than the space A. Therefore, a section 120 of the link member 106, which is between the shoulders 112 and the bent end edge 110 and has opposed side surfaces 121, must be deformed to slightly increase the space A to accommodate the opposed surfaces 112,118 to be inserted thereinto when the section 120 of the link member 106 is received in the notch 114. A resilient force produced by the deformation of the section 120 forces the shoulders 112 and the bent end edge 110 to restore and forcibly abut the respective opposed side surface 116 and 118 of the radial support wall 156 so that the housing 100 is securely attached to the radial support wall 156.

Figure 8:
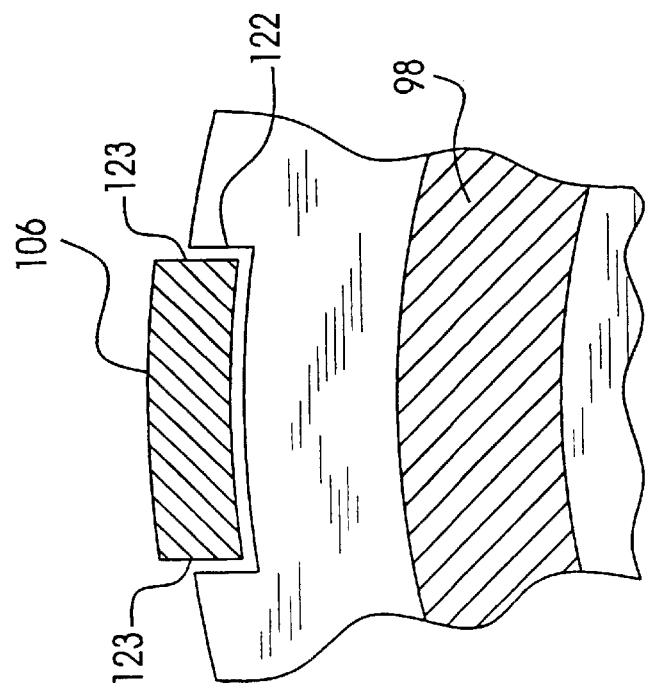
FIG. 8 is a partial cross-sectional view taken along line 8—8 in FIG. 6, showing the means for restraining the second brake shoe from rotating with the rotor disc.

The second annular brake shoe 180 in this embodiment includes a plurality of notches 122, only one being shown in FIG. 8, defined on the external periphery, circumferentially spaced apart from one another to receive the respective axial link member 106. Therefore, the opposed side surfaces 123 of the link members 106 engaged in the respective notches 122 will restrain the second annular brake shoe 180 from rotating together with the rotor disc 58 during a brake action.

As shown in FIG. 5, a plurality of dents 123 are defined on the external surface of the annular radial wall 102 of the housing 100 to increase air contact surfaces of the housing to avoid over-heat damage, functioning as the fins 99 in the embodiment shown in FIGS. 1 and 2.

Figure 9:
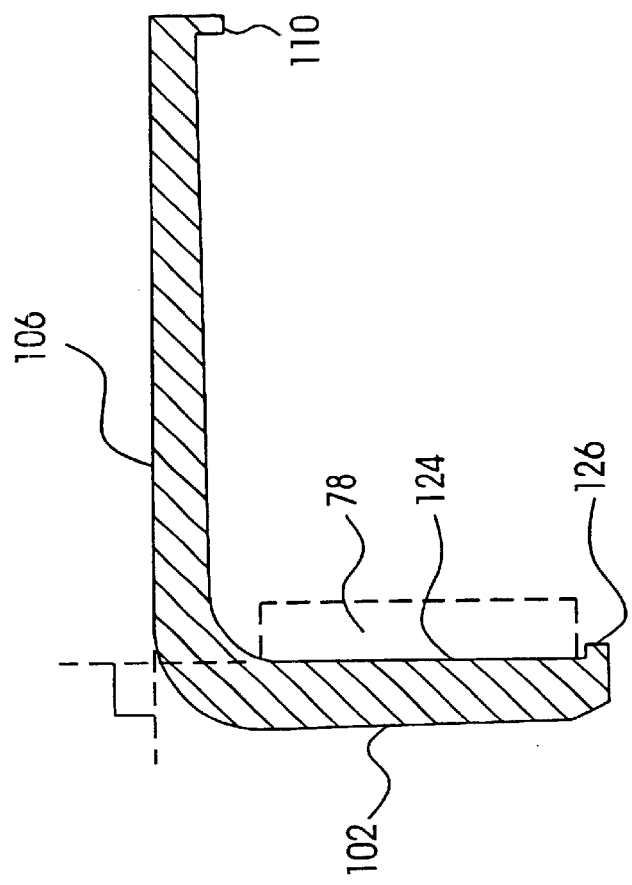
FIG. 9 is a partial, longitudinally cross-sectional view of FIG. 5, showing the inner surface of the first annular radial wall of the disc brake housing.

The features and structures of the brake assembly using the housing 100 in this embodiment which are identical to those of the embodiment 20 shown in FIG. 1 and referenced by the same numerals, will not be redundantly described. However, the clipping feature of the brake housing 100 is not only applicable to the disc brake assembly having vibration damping structure between the housing and the first brake shoe, as shown in FIG. 1, but also is enabled to be incorporated to the brake housing in the prior art, without the vibration damping structure between the housing and the first brake shoe. An example is illustrated in FIG. 9, in which the radial annular wall 102 has a planar inner surface 124 and a little flanged edge 126 at the inner periphery of the annular radial wall 102. The annular brake lining 78 is directly attached to the annular planar inner surface 124 and, for example, secured thereto by glue.

The clipping feature of the brake assembly using the disc brake housing 100 simplifies the housing structure and the assembly procedure.

It is noted that the brake housing 24 and 100 described above are preferably made integrally from cast iron or cast steel. The cast iron or cast steel is better than thin wall stamping to reduce the vibration of the housing. Using cast iron or cast steel may increase the weight of the housing in contrast to the thin wall stamping used in prior art housing. However, the link member structure of the housing according to the present invention is greatly reduced the material used for the housing in contrast to the cylindrical wall used for the housing in prior art, and efficiently offsets the negative aspect of the weight increase when using cast iron or cast steel.

Changes and modifications to the embodiments of the invention described above may be made without departing from the spirit and the scope of the invention which are intended to be limited only by the scope of the appended claims.

I claim:

1. A disc brake housing for a disc brake assembly for a vehicle wheel wherein the disc brake assembly includes first and second annular brake shoes, and an rotor disc co-axially mounted to the wheel and axially movable with respect to the wheel, during a braking action the second brake shoe being adapted to move axially towards the rotor disc and further presses the rotor disc against the first brake shoe, resulting in respective frictional engagement between the rotor disc and the first brake shoe, and between the rotor disc and the second brake shoe, the disc brake housing comprising:

an annular radial wall for resiliently supporting the first annular brake shoe to an inner edge thereof;

a plurality of link members extending axially from an external periphery of the annular radial wall for detachably connecting a support structure of the vehicle, and housing the rotor disc and the brake shoes; and an annular ridge raised from an inner surface of the annular radial wall to abut the first annular brake shoe so that uneven and variable forces applied to the first annular brake shoe from the rotor disc force local portions of the first annular brake shoe to oscillate about the ridge.

2. A disc brake housing as claimed in claim 1 wherein the inner edge of the annular radial wall includes a plurality of radially protruding members, circumferentially spaced apart from one another; the radially protruding members being adapted to extend into respective notches of the first annular brake shoe for radially and resiliently supporting the first annular brake shoe and preventing the first brake shoe from rotating with the rotor disc.

3. A disc brake housing as claimed in claim 2 wherein each of the link members extends from an axially flanged annular edge at the periphery of the annular radial wall, and includes an inner surface having a groove extending axially and inwardly from a distal end thereof, the grooves being adapted to slidably receive a plurality of keys of the second annular brake shoe to permit the axial movement of the second brake shoe and prevent the second brake shoe from rotating together with the rotor disc.

4. A disc brake housing as claimed in claim 1 wherein each of the link members extends from an axially flanged annular edge at the periphery of the annular radial wall and includes clip means at a distal end to enable the link member to clip onto an external periphery of an annular radial support wall which is mounted to the vehicle and operatively supports the second annular brake shoe.

5. A disc brake housing as claimed in claim 4 wherein the clip means includes a distal end edge bent at a substantially right angle with respect to the link member, and a pair of shoulders flanking the link member and axially spaced apart from the bent end edge so that a resilient force produced by deformation of the link member enables the bent end edge and the shoulders to forcibly abut a pair of opposed radial surfaces of the annular radial support wall to secure the housing to the annular radial support wall.

6. A disc brake housing as claimed in claim 5 wherein each of the link member comprises a first pair of opposed side surface extending axially from the distal end to the shoulders, adapted to be received in respective notches at an external periphery of the annular radial support wall.

7. A disc brake housing as claimed in claim 6 wherein each of the link member comprises a second pair of opposed side surface extending from the shoulders axially towards the flanged edge, adapted to be slidably received in respective notches at an external periphery of the second annular brake shoe to prevent the second brake shoe from rotating with the rotor disc.

8. A annular brake shoe for a disc brake assembly for a vehicle wheel wherein the disc brake assembly includes a disc brake housing, first and second annular brake shoes, and an rotor disc co-axially mounted to the wheel and axially movable with respect to the wheel, during a braking action the second brake shoe being adapted to move axially towards the rotor disc and further presses the rotor disc against the first brake shoe, resulting in respective frictional engagement between rotor disc and the first brake shoe, and between the rotor disc and the second brake shoe, the annular brake shoe adapted to be used as the first annular brake shoe comprising:
an annular axial section adapted to be radially and resiliently supported to an inner annular edge of an annular radial wall of the housing; and
an annular radial section extending outwardly from the axial section, adapted to abut an annular ridge raise from an inner surface of the annular radial wall of the housing during a brake action so that uneven and variable forces applied to the annular brake shoe from the rotor disc force local portions of the annular brake shoe to oscillate about the ridge.

9. An annular brake shoe as claimed in claim 8 wherein the axial section comprises a plurality of resilient damping pads attached thereto, and circumferentially spaced apart from one another, adapted to be supported to the inner edge of the annular radial wall of the housing.

10. An annular brake shoe as claimed in claim 9 wherein the axial section includes a plurality of notches on an external periphery, spaced apart from one another, each of the notches having one of the damping pads attached to the bottom thereof, and receiving a plurality of radially protruding members of the annular radial wall of the housing extending thereinto respectively, to contact the damping pads and prevent the first brake shoe from rotating with the rotor disc.

11. A disc brake assembly for a vehicle wheel which includes first and second annular brake shoes; an rotor disc having first and second annular radial planar friction surfaces substantially parallel to each other, the rotor disc being co-axially mounted to the wheel and axially movable with respect to the wheel; means for restraining the first brake shoe from rotating with the rotor disc; means for restraining the second brake shoe from rotating with the rotor disc; and an annular fluid expandable bladder, whereby upon expansion of the bladder the second brake shoe moves axially towards the rotor disc and further presses the rotor disc against the first brake shoe, resulting in respective frictional engagement between the first friction surface of the rotor disc and the first brake shoe, and between the second friction surface of the rotor disc and the second brake shoe; the disc brake assembly further comprising:
a housing having an annular radial wall operatively supporting the first annular brake shoe adjacent to the first friction surface of the rotor disc;
a radial support wall adapted to be mounted to a frame of the vehicle and operatively supporting the bladder and the second annular brake shoe adjacent to the second friction surface of the rotor disc;
the annular radial wall being axially spaced apart from and detachably connected to the radial support wall; and
damping means between the annular radial wall and the first brake shoe for reducing vibration produced from the first brake shoe when the first brake shoe is frictionally engaged with the first friction surface of the rotor disc.

12. A disc brake assembly as claimed in claim 11 wherein the damping means comprises a plurality of damping pads circumferentially spaced apart from one another and attached to an axial section of the first brake shoe to contact an inner edge of the annular radial wall.

13. A disc brake assembly as claimed in claim 12 wherein the damping pads are made of a resilient and deformable material.

14. A disc brake assembly as claimed in claim 12 wherein the annular radial wall comprises an annular ridge raised from an inner surface of the wall to abut a radial section of the first brake shoe when the first brake shoe is pressed by the rotor disc during the frictional engagement.

15. A disc brake assembly as claimed in claim 14 wherein the inner edge of the annular radial wall includes a plurality of radially protruding members, circumferentially spaced apart one another; and the axial section of the first brake shoe includes a plurality of notches on an external periphery, spaced apart from one another, each of the notches having one of the damping pads attached to the bottom thereof; and whereby the radially protruding members extend into the respective notches to contact the damping pads and the protruding members engage the notches to prevent the first brake shoe from rotating with the rotor disc.

16. A disc brake assembly as claimed in claim 15 wherein the annular ridge has a radius substantially equal to an average radius of the first annular radial planar friction surface.

17. A disc brake assembly as claimed in claim 11 wherein the annular radial wall of the housing comprises an axially flanged edge at the external periphery, and a plurality of axial link members integrally extending from the flanged edge, circumferentially spaced apart from one another.

18. A disc brake assembly as claimed in claim 17 wherein a distal end of each of the link members is detachably connected to the radial support wall.

19. A disc brake assembly as claimed in claim 18 wherein each of the link members includes an inner surface having a groove extending axially and inwardly from the distal end thereof, and the second brake shoe includes a plurality of keys located at the external periphery thereof and circumferentially spaced apart from one another, slidably fit in the respective grooves to permit the axial movement of the second brake shoe and prevent the second brake shoe from rotating together with the rotor disc.

20. A disc brake assembly as claimed in claim 18 wherein each of the link members comprises clip means at the distal end to enable the link members to clip onto an external periphery of the radial support wall.

21. A disc brake assembly as claimed in claim 20 wherein the clip means includes a distal end edge bent at a substantially right angle with respect to the link member, and a pair of shoulders flanking the link member and spaced apart from the bent end edge so that a resilient force produced by deformation of the link member enables the bent end edge and the shoulders to forcibly abut a pair of opposed radial surfaces of the radial support wall to secure the housing thereto.

22. A disc brake assembly as claimed in claim 21 wherein the radial support wall includes a plurality of notches at the external periphery thereof to receive in each notch a section of the respective link members when the bent end edge and the shoulders forcibly abut the respective opposed radial surfaces of the radial support wall.

23. A disc brake assembly as claimed in claim 22 wherein the second brake shoe includes a plurality of notches at an external periphery thereof to slidably engage the respective link members so that the second brake shoe is permitted to move axially with respect to the link members and prevented from rotating with the rotor disc.

24. A disc brake assembly for a vehicle wheel which includes first and second annular brake shoes; an rotor disc having first and second annular radial planar friction surfaces substantially parallel to each other, the rotor disc being co-axially mounted to the wheel and axially movable with respect to the wheel; means for restraining the first brake shoe from rotating with the rotor disc; means for restraining the second brake shoe from rotating with the rotor disc; and an annular fluid expandable bladder extending between a radial support wall and the second brake shoe, whereby upon expansion of the bladder the second brake shoe moves axially towards the rotor disc and further presses the rotor disc against the first brake shoe, resulting in respective frictional engagement between the first friction surface of the rotor disc and the first brake shoe, and between the second friction surface of the rotor disc and the second brake shoe; the disc brake assembly further comprising:

a housing having an annular radial wall operatively supporting a first annular brake shoe adjacent to the first friction surface of the rotor disc, and a plurality of axial link members integrally extending from the radial wall, circumferentially spaced apart from one another;

an annular radial support wall adapted to be mounted to a frame of the vehicle, the support wall detachably securing the link members and axially spaced apart from the annular radial wall, and operatively supporting the bladder and the second annular brake shoe adjacent to the second friction surface of the rotor disc; and clip means at a distal end of each of the link members to enable the link members to clip onto an external periphery of the annular radial support wall.

25. A disc brake assembly as claimed in claim 24 wherein the clip means includes a distal end edge bent at a substantially right angle with respect to the link member, and a pair of shoulders flanking the link member and spaced apart from the bent end edge so that a resilient force produced by deformation of the link member enables the bent end edge and the shoulders to forcibly abut a pair of opposed radial surfaces of the annular radial support wall to secure the housing thereto.

26. A disc brake assembly as claimed in claim 25 wherein the annular radial support wall includes a plurality of notches at an external periphery thereof to receive in each notch a section of the respective link members when the bent end edge and the shoulders forcibly abut the respective opposed radial surfaces of the annular radial support wall.

27. A disc brake assembly as claimed in claim 26 wherein the second brake shoe includes a plurality of notches at an external periphery thereof to slidably engage the respective link members so that the second brake shoe is permitted to move axially with respect to the link members and prevented from rotating with the rotor disc.

* * * * *